US012072564B2

(12) United States Patent
Mogi et al.

(10) Patent No.: US 12,072,564 B2
(45) Date of Patent: Aug. 27, 2024

(54) IMAGE FORMING APPARATUS

(71) Applicant: BROTHER KOGYO KABUSHIKI KAISHA, Nagoya (JP)

(72) Inventors: Mariko Mogi, Nagoya (JP); Hidenori Jo, Nagoya (JP); Yuki Nagashima, Toyokawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/053,829

(22) Filed: Nov. 9, 2022

(65) Prior Publication Data

US 2023/0152619 A1   May 18, 2023

(30) Foreign Application Priority Data

Nov. 12, 2021   (JP) .................................. 2021-185016

(51) Int. Cl.
   *G02F 1/1333*   (2006.01)
   *G02F 1/01*     (2006.01)

(52) U.S. Cl.
   CPC ........ *G02F 1/13338* (2013.01); *G02F 1/0102* (2013.01)

(58) Field of Classification Search
   CPC ............... G02F 1/13338; G02F 1/0102; G02F 1/133308; G02F 1/1362; H04N 1/00384; H04N 1/00392; H04N 1/00408; H04N 1/00411; H04N 1/00413; H04N 1/0044; H04N 1/00474; H04N 1/00493; H04N 1/00503; H04N 2201/0094; G03G 15/5016; G03G 15/502; G06F 3/048; G06F 3/0488

See application file for complete search history.

(56) References Cited

U.S. PATENT DOCUMENTS

| 2007/0195064 A1* | 8/2007 | Morioka | H04N 13/398 345/173 |
| 2013/0207915 A1* | 8/2013 | Asai | H04N 1/00411 345/173 |
| 2013/0266335 A1 | 10/2013 | Miyagawa | |
| 2019/0215409 A1* | 7/2019 | Ogino | H04N 1/00411 |
| 2020/0110308 A1* | 4/2020 | Hattori | G02F 1/133603 |

FOREIGN PATENT DOCUMENTS

| JP | 2012156579 A | * 8/2012 |
| JP | 2015-232729 A | 12/2015 |

* cited by examiner

*Primary Examiner* — Abhishek Sarma
(74) *Attorney, Agent, or Firm* — Merchant & Gould P.C.

(57) ABSTRACT

An image forming apparatus includes an image forming unit including a photosensitive drum, a housing configured to house the image forming unit, and a display operation panel located on an upper surface of the housing. The display operation panel includes a display panel including a display surface on an upper surface of the display panel, and a touch panel including a touch surface on an upper surface of the touch panel. The touch surface includes a first region overlapping the display surface, and a second region not overlapping the display surface. A front end edge of the display panel is located behind and above a front end edge of the touch panel such that the second region is located in front of and below the first region.

14 Claims, 9 Drawing Sheets

IMAGE FORMING APPARATUS

REFERENCE TO RELATED APPLICATIONS

This application claims priority from Japanese Patent Application No. 2021-185016 filed on Nov. 12, 2021. The entire content of the priority application is incorporated herein by reference.

BACKGROUND ART

A related art discloses an example of an image forming apparatus. In the image forming apparatus, a liquid crystal display panel is located on an upper surface of an operation unit cover constituting a part of a housing.

The liquid crystal display panel has a plate shape and including a display surface on an upper surface, and is inclined such that a front end edge is located below a rear end edge. The liquid crystal display panel performs display.

An operation key unit is located in front of the liquid crystal display panel on the upper surface of the operation unit cover. The operation key unit includes a plurality of operation buttons and receives an operation input.

DESCRIPTION

In the image forming apparatus in the related art, the liquid crystal display panel and the operation key unit are separated from each other. However, in recent years, an image forming apparatus often adopts a configuration in which a display operation panel including a display panel and a touch panel overlapping the display panel from above is located on an upper surface of a housing.

Such a display operation panel tends to increase in size in an up-down direction due to an increase in thickness caused by an overlap between the display panel and the touch panel.

The present disclosure has been made in view of the above circumstances in the related art, and an object thereof is to provide an image forming apparatus reducing an increase in size of a display operation panel in an up-down direction.

An image forming apparatus includes: an image forming unit including a photosensitive drum; a housing configured to house the image forming unit; and a display operation panel located on an upper surface of the housing, in which the display operation panel includes: a display panel having a plate shape, including a display surface on an upper surface of the display panel, and being inclined such that a front end edge of the display panel is located below a rear end edge of the display panel; and a touch panel having a plate shape thinner than the display panel, including a touch surface on an upper surface of the touch panel, being inclined such that a front end edge of the touch panel is located below a rear end edge of the touch panel, and overlapping the display panel from above, the touch surface includes: a first region overlapping the display surface and configured to receive an input operation with respect to the touch panel; and a second region not overlapping the display surface and configured to receive the input operation with respect to the touch panel, and the front end edge of the display panel is located behind and above the front end edge of the touch panel such that the second region is located in front of and below the first region.

An image forming apparatus includes: an image forming unit including a photosensitive drum; a housing configured to house the image forming unit; and a display operation panel located on an upper surface of the housing, in which the operation panel includes: a display panel having a plate shape and including a display surface on an upper surface of the display panel; and a touch panel having a plate shape, including a touch surface on an upper surface of the touch panel, and overlapping the display panel from above, the touch panel includes: a first region overlapping the display surface and configured to receive an input operation with respect to the touch panel; and a second region located below the first region, not overlapping the display surface, and configured to receive the input operation with respect to the touch panel, and the second region of the touch panel is located below the upper surface of the housing.

In the image forming apparatus according to the present disclosure, the display panel thicker than the touch panel is located on an upper portion of the display operation panel, and only the touch panel is located on a lower portion of the display operation panel. As a result, in the image forming apparatus, it is possible to reduce a thickness of the lower portion of the display operation panel as compared with a configuration in which the display panel and the touch panel overlap each other even in the lower portion of the display operation panel.

Therefore, in the image forming apparatus according to the present disclosure, it is possible to prevent an increase in size of the display operation panel in the up-down direction. As a result, in the image forming apparatus, it is possible to prevent an increase in size of the entire apparatus in the up-down direction.

Hereinafter, an exemplary embodiment of the present disclosure will be described with reference to the drawings.

EMBODIMENT

Figure 1:
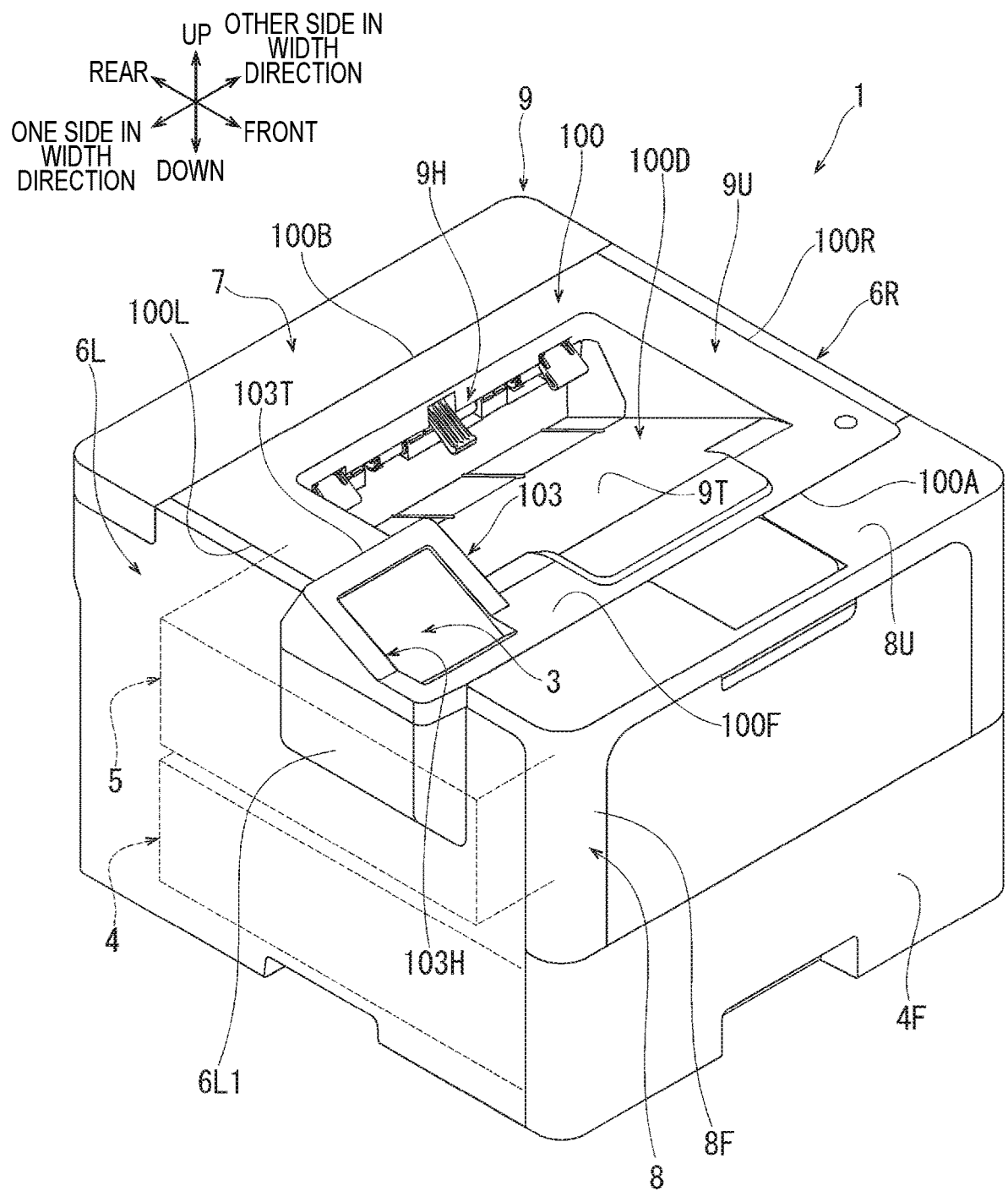
FIG. 1 is a perspective view of an image forming apparatus according to the present disclosure.

As shown in FIG. 1, an image forming apparatus 1 according to the embodiment is an example of a specific aspect of the image forming apparatus according to the present disclosure. In FIG. 1, a front cover 8 side of a housing 9 of the image forming apparatus 1 is a front side. A width direction of the housing 9 is a direction orthogonal to a front-rear direction and extending horizontally. When facing the front cover 8, a left side is one side in the width direction. Further, directions shown in FIG. 2 and subsequent drawings are all displayed in correspondence with the directions shown in FIG. 1.

<Overall Configuration>

As shown in FIG. 1, the image forming apparatus 1 includes the housing 9, an image forming unit 5, a sheet cassette 4, and a display operation panel 3.

The housing 9 is a substantially box-shaped body. The housing 9 houses the sheet cassette 4 at a lower portion thereof. The sheet cassette 4 supports sheets subjected to image forming in a stacked state.

In addition, the housing 9 houses the image forming unit 5 above the sheet cassette 4 inside the housing 9. The image forming unit 5 forms an image on a sheet conveyed from the sheet cassette 4 by an electrophotographic method, an inkjet method, or the like. The image forming unit 5 using the electrophotographic method includes a photosensitive drum.

The housing 9 includes, as an outer cover, a top cover 100, a front cover 8, a rear cover 7, and side covers 6L and 6R. The top cover 100 is an example of the "cover" according to the present disclosure. In the present embodiment, each of the top cover 100 and the like is a resin molded product manufactured by injection molding or the like of a thermoplastic resin.

The front cover 8 includes a front wall 8F and an upper wall 8U. The front wall 8F is located above a front panel 4F of the sheet cassette 4. The front wall 8F of the front cover 8 and the front panel 4F of the sheet cassette 4 constitute a front surface of the housing 9. The upper wall 8U is connected to an upper end edge of the front wall 8F, protrudes rearward, and extends in the width direction. The upper wall 8U constitutes a front end edge side of an upper surface 9U of the housing 9.

The rear cover 7 constitutes a rear end edge side of the upper surface 9U of the housing 9. The side cover 6L located on the one side in the width direction constitutes a side surface of the housing 9 located on the one side in the width direction. The side cover 6R located on the other side in the width direction constitutes a side surface of the housing 9 located on the other side in the width direction.

A front end edge 100A of the top cover 100 faces a rear end edge of the upper wall 8U of the front cover 8. A rear end edge 100B of the top cover 100 faces a front end edge of the rear cover 7. The top cover 100 constitutes the upper surface 9U of the housing 9 together with the upper wall 8U of the front cover 8 and the rear cover 7.

The top cover 100 includes a flat surface 100F that includes the front end edge 100A and the rear end edge 100B, and extends substantially horizontally.

In addition, the top cover 100 includes a panel housing unit 103 in a portion located in front of the top cover 100 and on the one side in the width direction. The panel housing unit 103 includes a portion protruding upward from the flat surface 100F and a portion overlapping the flat surface 100F.

The side cover 6L located on the one side in the width direction includes a bulging portion 6L1 located below the panel housing unit 103. The bulging portion 6L1 protrudes to the one side in the width direction along the panel housing unit 103.

A side end edge 100L of the top cover 100 located on the one side in the width direction and located behind the panel housing unit 103 faces an upper end edge of the side cover 6L located behind the bulging portion 6L1. A side end edge 100R of the top cover 100 located on the other side in the width direction faces an upper end edge of the side cover 6R.

The top cover 100 includes a recessed portion 100D recessed downward from the flat surface 100F.

The housing 9 includes, on the upper surface 9U thereof, a sheet discharging port 9H and a discharging tray 9T. The discharging tray 9T is a bottom surface of the recessed portion 100D of the top cover 100, and is inclined downward and rearward. The sheet discharging port 9H is located on a rear surface rising from a rear end of the bottom surface of the recessed portion 100D.

The sheet on which an image is formed by the image forming unit 5 is discharged forward from the sheet discharging port 9H. The discharging tray 9T supports the sheet discharged from the sheet discharging port 9H.

Figure 2:
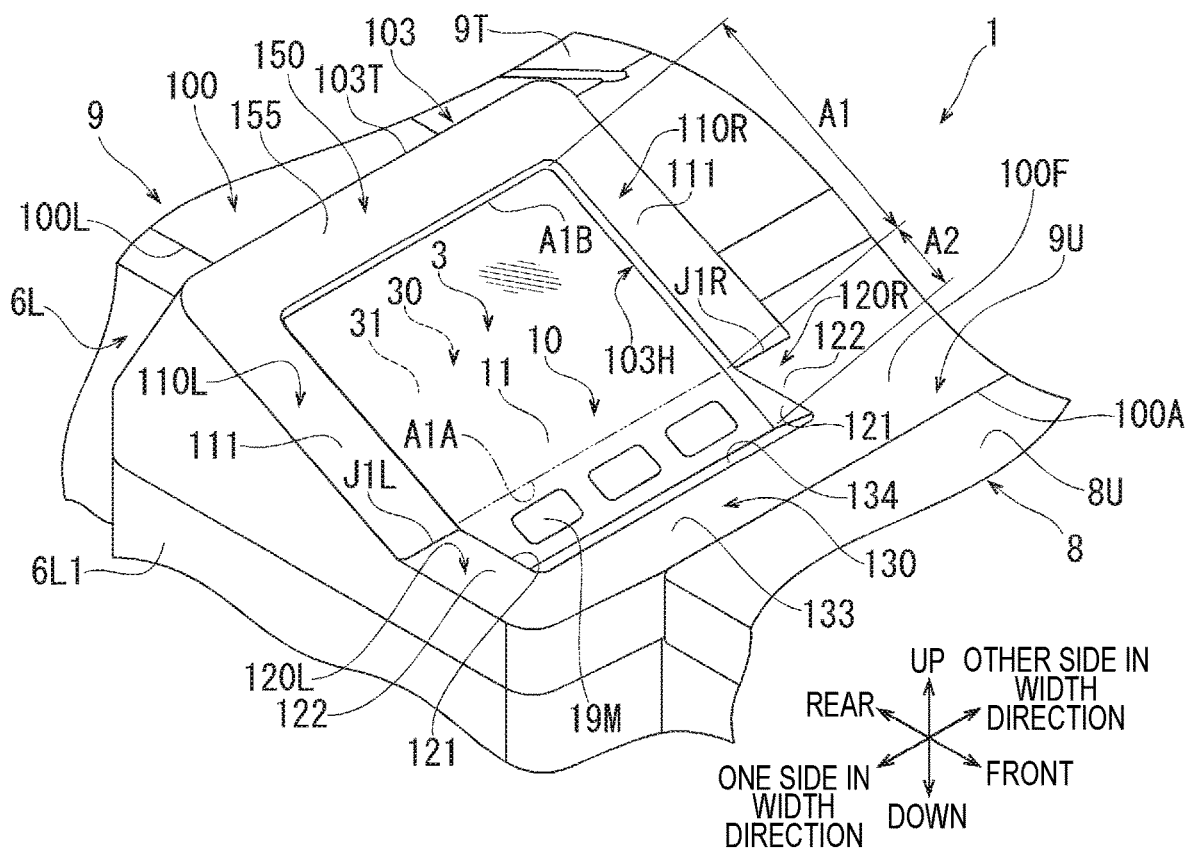
FIG. 2 is a partial perspective view of the image forming apparatus according to the present disclosure.
Figure 3:
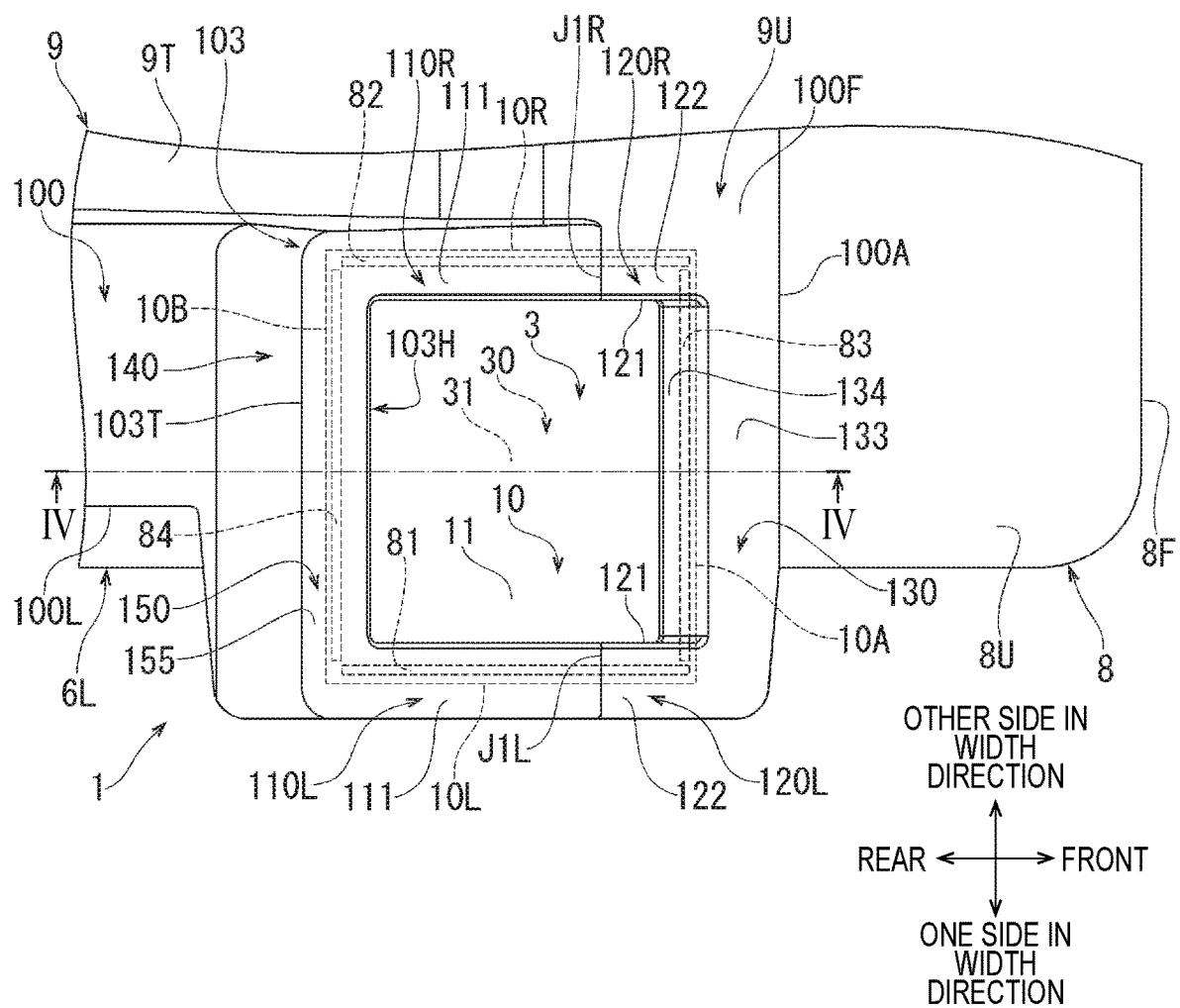
FIG. 3 is a partial top view of the image forming apparatus according to the present disclosure.
Figure 4:
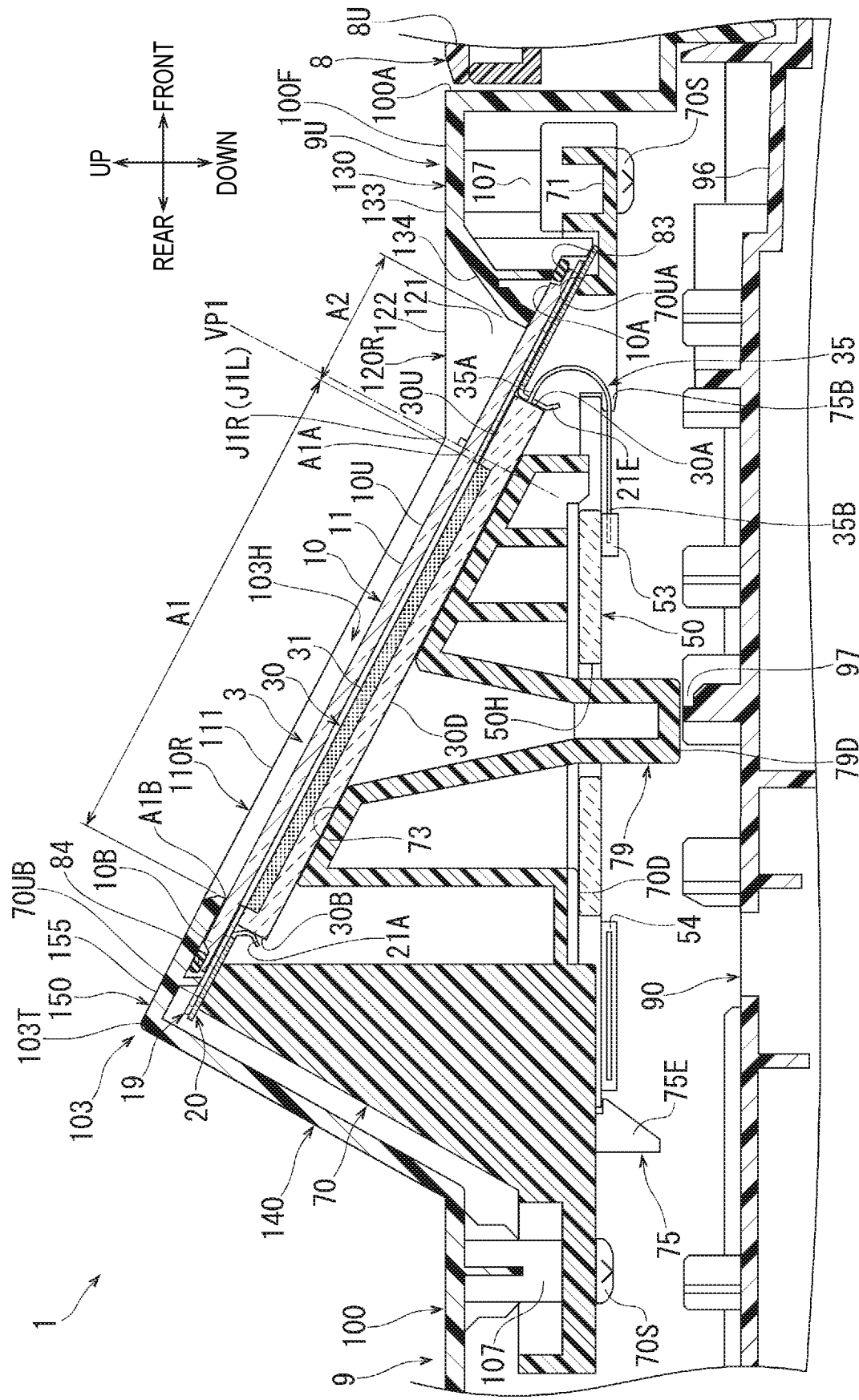
FIG. 4 is a partial cross-sectional view taken along line IV-IV of FIG. 3.

As shown in FIGS. 2 to 4, the display operation panel 3 is housed in the panel housing unit 103 and is located on the upper surface 9U of the housing 9. The display operation panel 3 is located at a position shifted to the one side in the width direction with respect to the discharging tray 9T. A control unit, which is not shown, controls the display operation panel 3 to cause the display operation panel 3 to display various kinds of information such as setting information and an operation status of the image forming unit 5, and to acquire, from the display operation panel 3, information on an operation input performed by a user.

Next, specific configurations of the panel housing unit 103 and the display operation panel 3 will be described in detail.

<Panel Housing Unit>

A top portion 103T of the panel housing unit 103 is a ridge line extending horizontally in the width direction at a position separated upward from the flat surface 100F of the top cover 100.

Figure 5:
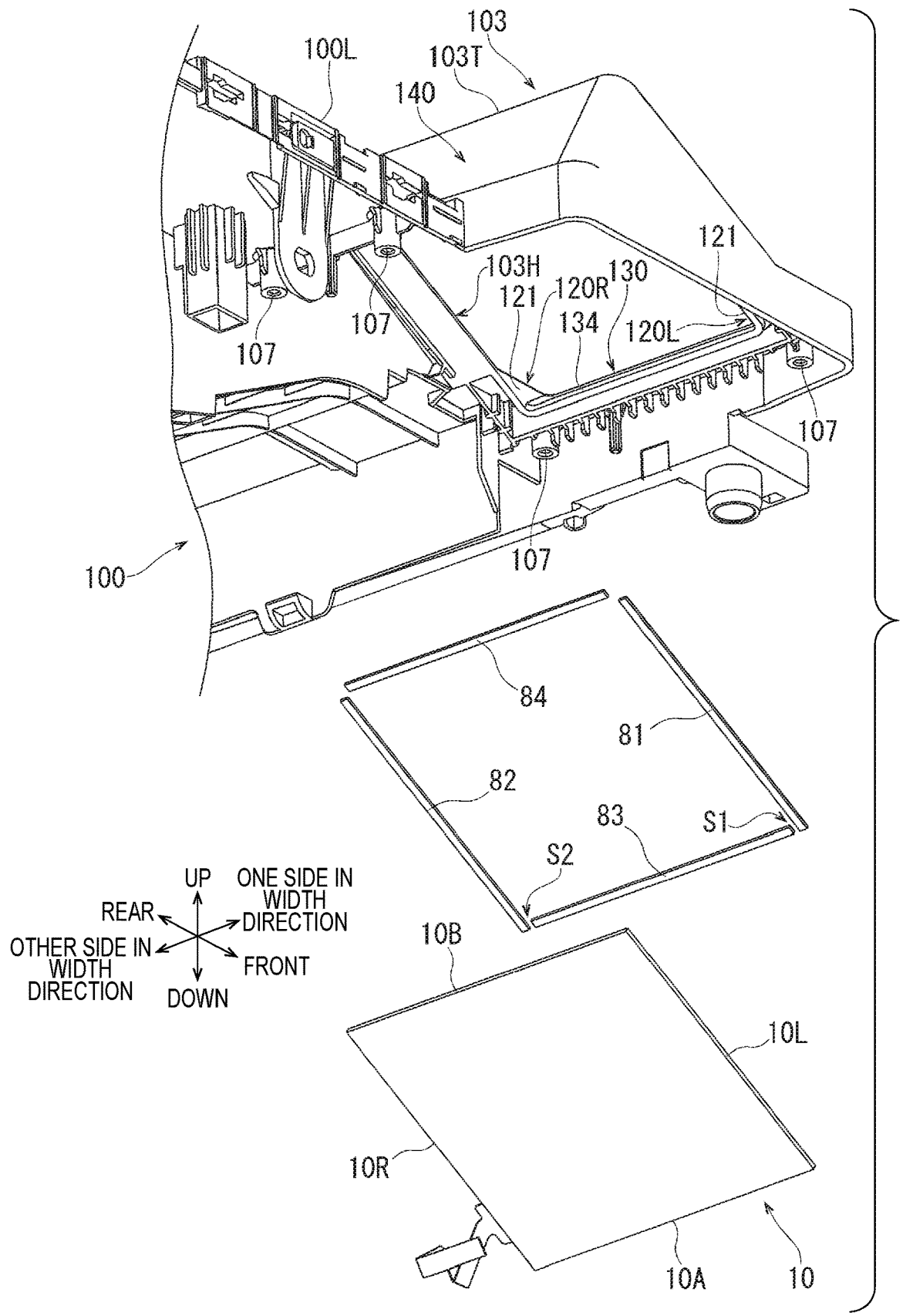
FIG. 5 is an exploded perspective view showing a part of a top cover, first to fourth sealing members, and a touch panel.

As shown in FIGS. 3 to 5, the panel housing unit 103 includes a fourth portion 140 behind the top portion 103T. The fourth portion 140 is inclined downward and rearward in a steep angle from the top portion 103T, and extends in the width direction.

The fourth portion 140 includes a portion protruding to the one side in the width direction from the side end edge 100L of the top cover 100, and a portion connected to the flat surface 100F of the top cover 100.

As shown in FIGS. 2 to 4, the panel housing unit 103 includes, between the top portion 103T and the front end edge 100A of the top cover 100, a fifth portion 150, two first portions 110L and 110R, two second portions 120L and 120R, and a third portion 130.

The fifth portion 150 includes a fifth upper surface 155. The fifth upper surface 155 is a flat surface that is gradually inclined downward and forward from the top portion 103T and extends in the width direction.

The first portions 110L and 110R are located in front of the fifth portion 150. Each of the first portions 110L and 110R includes a first upper surface 111.

The first upper surface 111 of the first portion 110L located on the one side in the width direction is connected to one end of the fifth upper surface 155 in the width direction.

The first upper surface 111 of the first portion 110R located on the other side in the width direction is connected to the other end of the fifth upper surface 155 in the width direction.

Each of the first upper surfaces 111 is a flat surface that is gradually inclined downward and forward and extends in the width direction. The fifth upper surface 155 and the first upper surfaces 111 are flush with one another.

The second portions 120L and 120R are located in front of the first portions 110L and 110R. Each of the second portions 120L and 120R includes a second upper surface 122.

The second upper surface 122 of the second portion 120L located on the one side in the width direction is connected to the first upper surface 111 of the first portion 110L and extends forward in a horizontal direction and in the width direction.

The second upper surface 122 of the second portion 120R located on the other side in the width direction is connected to the first upper surface 111 of the first portion 110R and extends forward in the horizontal direction and in the width direction.

The second upper surfaces 122 of the second portions 120L and 120R overlap the flat surface 100F.

The third portion 130 is located in front of the second portions 120L and 120R. The third portion 130 includes a third upper surface 133 and a fourth upper surface 134.

The third upper surface 133 is connected to the second upper surfaces 122 and extends forward in the horizontal direction and in the width direction. The third upper surface 133 overlaps the flat surface 100F.

As shown in FIGS. 2 to 5, the fourth upper surface 134 is inclined downward from a rear end edge of the third upper surface 133 located between the second upper surfaces 122.

Further, each of the second portions 120L and 120R includes a first side surface 121.

The first side surface 121 of the second portion 120L extends downward in a vertical direction and in the front-rear direction from a side end edge of the second upper surface 122 of the second portion 120L located on the other side in the width direction. The first side surface 121 of the second portion 120L is connected to one end of the fourth upper surface 134 in the width direction.

The first side surface 121 of the second portion 120R extends downward in the vertical direction and in the front-rear direction from a side end edge of the second upper surface 122 of the second portion 120R located on the one side in the width direction. The first side surface 121 of the second portion 120R is connected to the other end of the fourth upper surface 134 in the width direction.

The panel housing unit 103 has a panel opening 103H. The panel opening 103H is a rectangular opening surrounded by the fifth upper surface 155, the first upper surfaces 111, the first side surfaces 121, and the fourth upper surface 134.

<Display Operation Panel>

As shown in FIGS. 4 to 8, the display operation panel 3 includes first to fourth sealing members 81 to 84, a touch panel 10, a film 19, a metal plate member 20, a display panel 30, a holder 70, and a control board 50 in this order from top to bottom.

<Display Panel>

Figure 8:
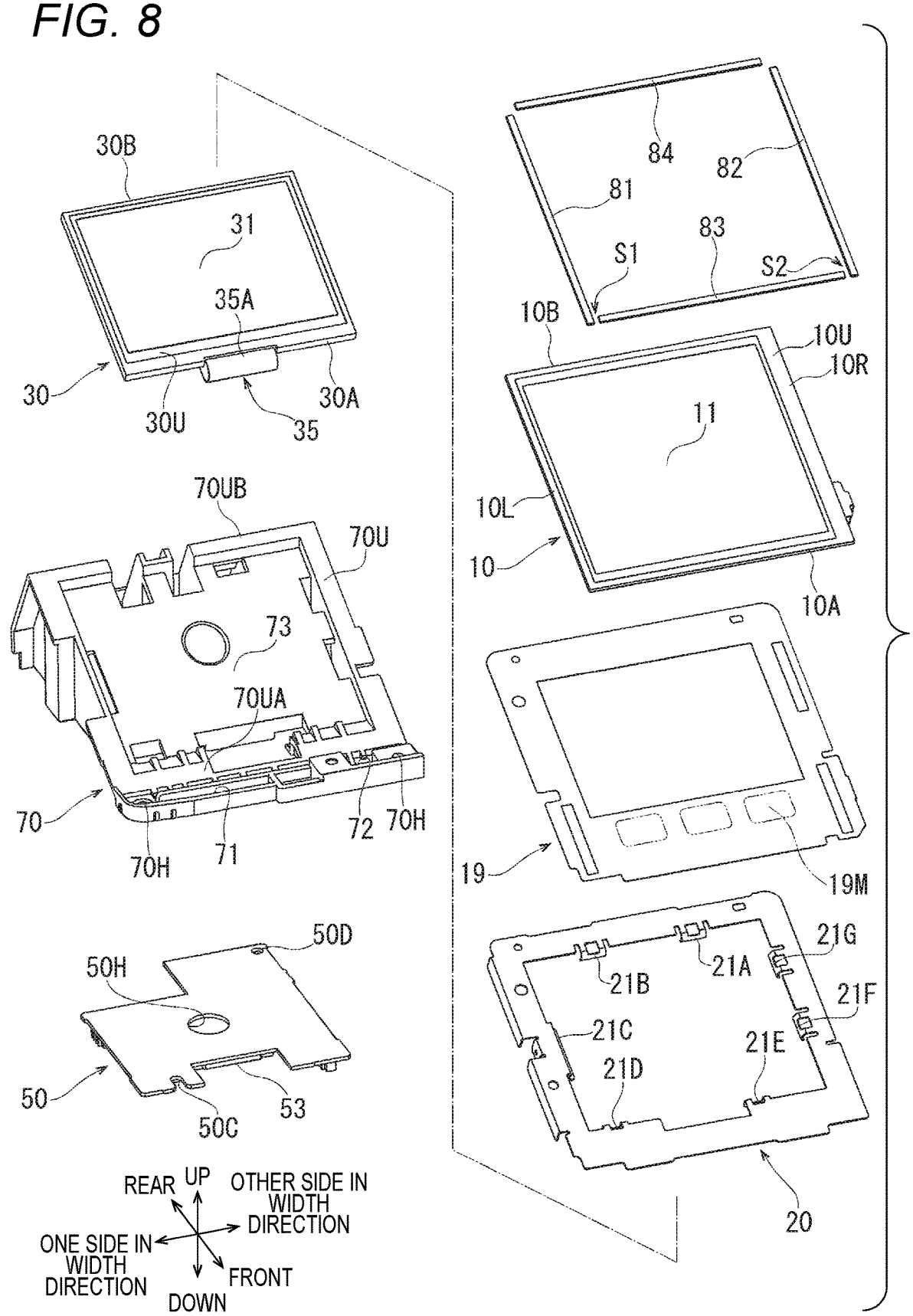
FIG. 8 is an exploded perspective view showing the first to fourth sealing members, the touch panel, the film, the metal plate member, the display panel, the holder, and the control board.

As shown in FIG. 8, the display panel 30 has a substantially rectangular flat plate shape, and includes a substantially rectangular display surface 31 on an upper surface 30U. In the present embodiment, the display panel 30 is a liquid crystal display, and includes a backlight, which is not shown, below the display surface 31.

As shown in FIG. 4, the display panel 30 is inclined such that a front end edge 30A is located below a rear end edge 30B.

<Metal Plate Member>

Figure 6:
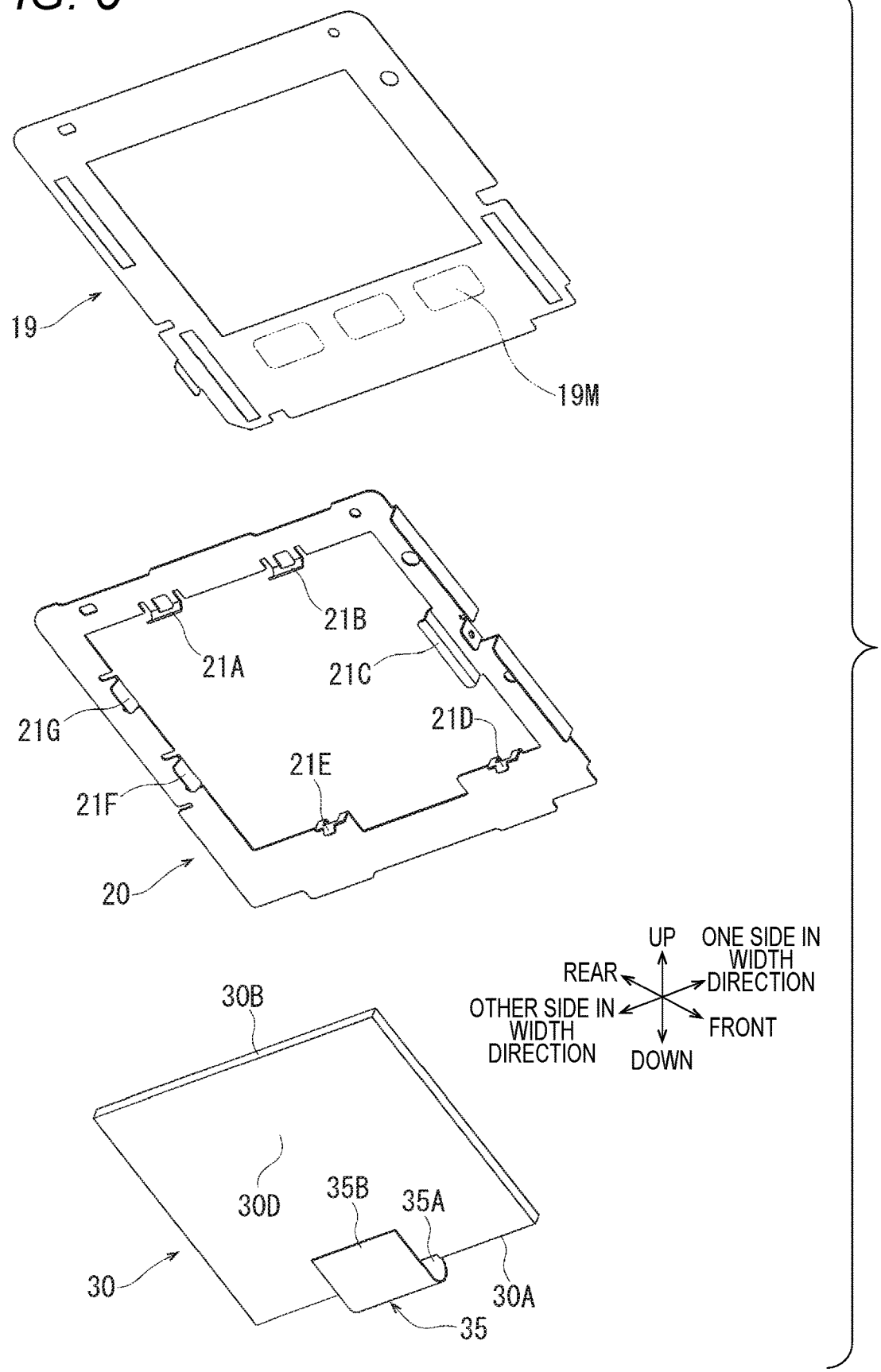
FIG. 6 is an exploded perspective view showing a film, a metal plate member, and a display panel.

As shown in FIGS. 6 and 8, the metal plate member 20 is manufactured by punching and bending a thin steel plate. The metal plate member 20 has a rectangular hole larger than an outer shape of the display panel 30, and includes a plurality of locking pieces 21A to 21G protruding downward from an inner circumferential edge surrounding the rectangular hole.

As shown in FIG. 4, the metal plate member 20 comes into contact with the front end edge 30A, the rear end edge 30B, and a pair of side end edges of the display panel 30 in a state where the locking pieces 21A to 21G are elastically deformed, to sandwiches the display panel 30. In this state, an upper surface of the metal plate member 20 is substantially flush with the display surface 31.

<Film>

As shown in FIGS. 6 and 8, the film 19 is a substantially rectangular resin thin film having a certain degree of rigidity. The film 19 has a rectangular hole slightly larger than the outer shape of the display panel 30, and a plurality of marks 19M are printed, on the film 19, below the rectangular hole.

Although not shown, each mark 19M is designed such that the user can easily determine that the mark 19M is a button display corresponding to a specific operation input. As shown in FIG. 4, the film 19 overlaps the metal plate member 20 from above. The film 19 exposes the display surface 31 through the rectangular hole.

<Holder>

Figure 7:
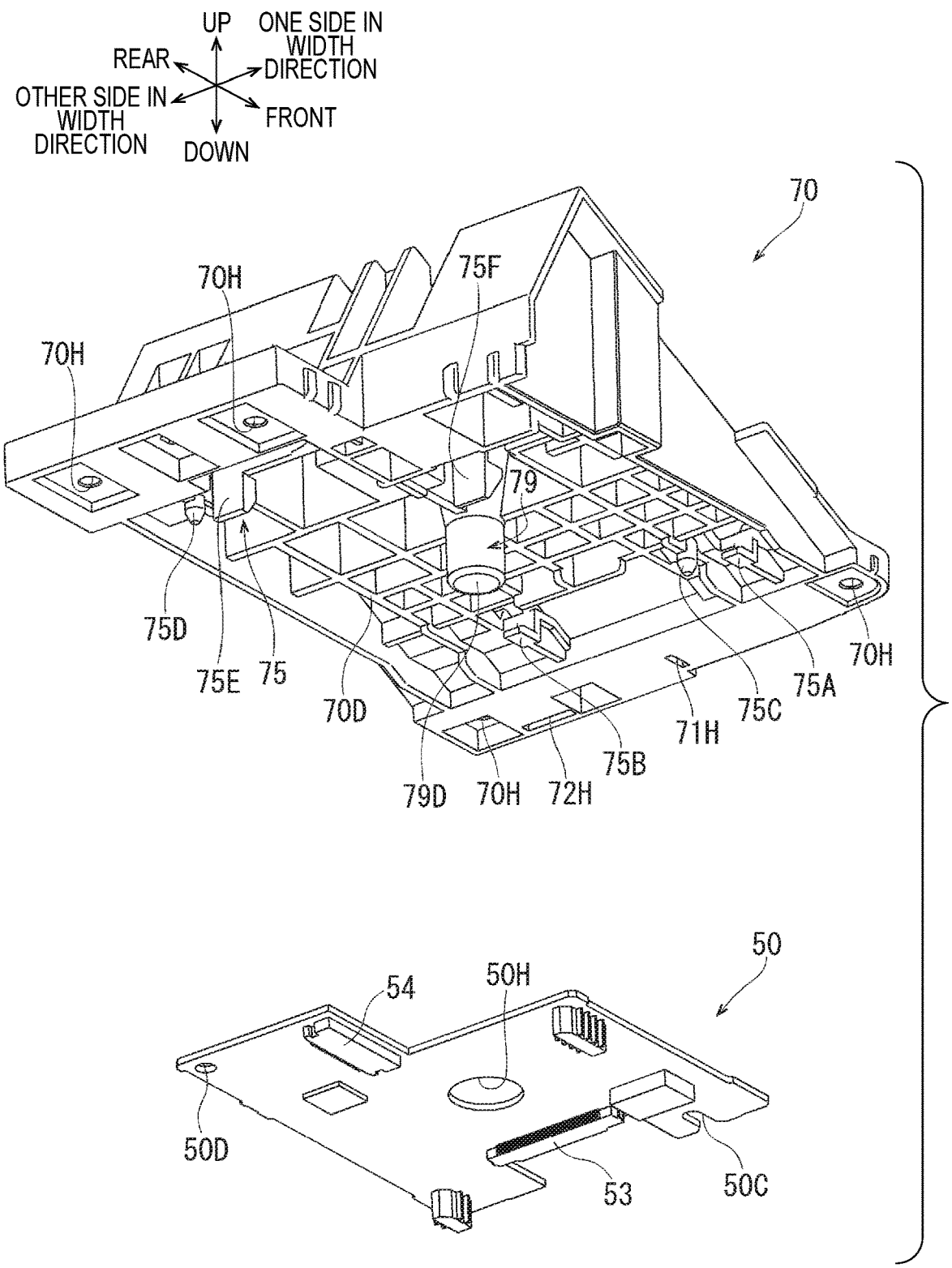
FIG. 7 is an exploded perspective view showing a holder and a control board.
Figure 9:
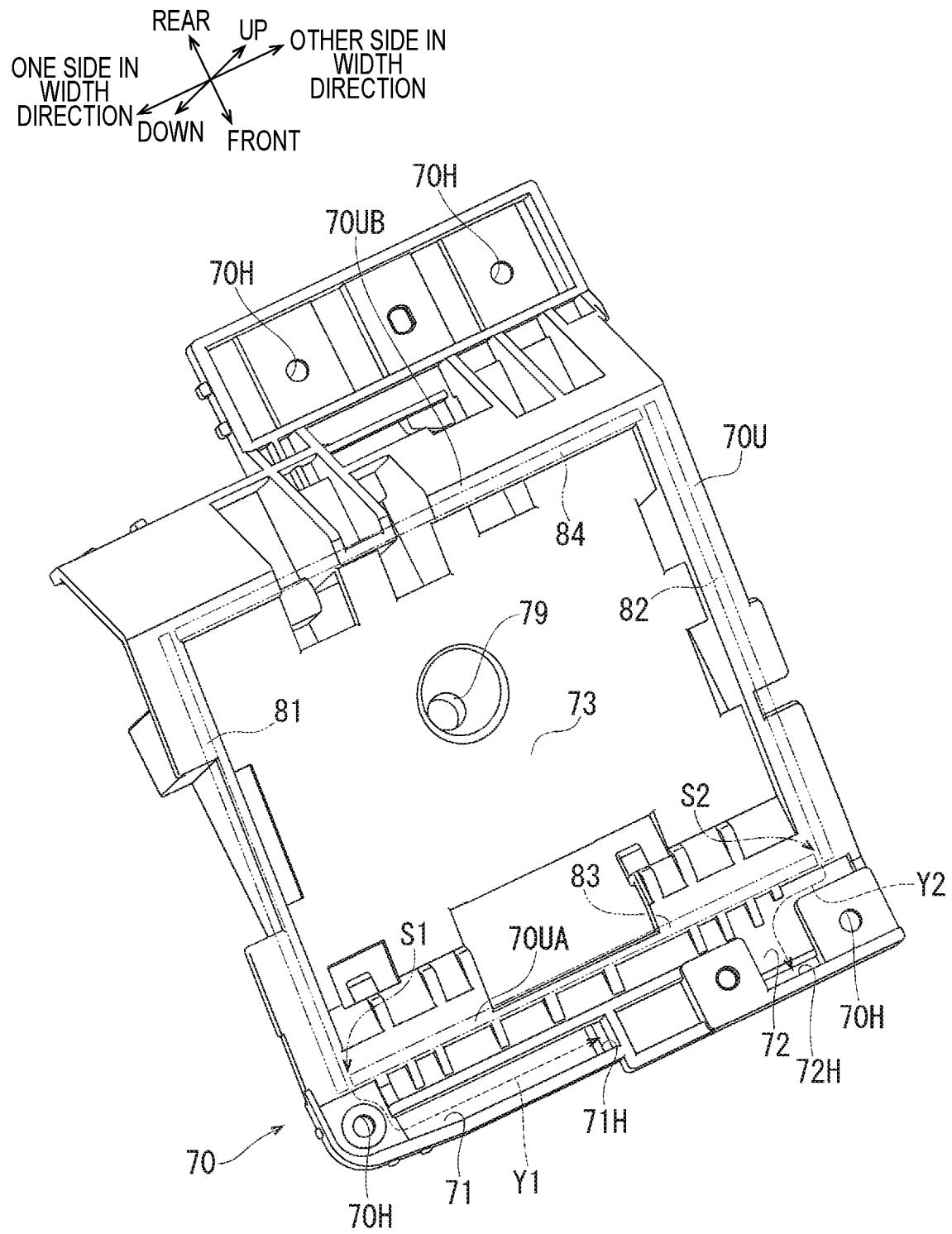
FIG. 9 is a perspective view of the holder.

As shown in FIGS. 7, 8, and 9, the holder 70 is a resin molded product manufactured by injection molding or the like of a thermoplastic resin.

As shown in FIG. 7, a lower surface 70D of the holder 70 includes a substantially horizontal surface including lower ends of a plurality of ribs connected to one another in a lattice shape, a stepped surface having a step on the horizontal surface, and the like.

As shown in FIG. 9, the holder 70 includes four screw holes 70H. As shown in FIG. 5, the panel housing unit 103 includes four bosses 107 on a lower surface thereof. As shown in FIG. 4, four screws 70S pass through the respective screw holes 70H from below and are screwed into the respective bosses 107, whereby the holder 70 is fastened to the panel housing unit 103.

As shown in FIGS. 8 and 9, an upper surface 70U of the holder 70 is inclined such that a front end edge 70UA is located below a rear end edge 70UB. The holder 70 includes a support surface 73 on the upper surface 70U. The support surface 73 is a bottom surface of a recessed portion recessed one step lower than the front end edge 70UA and the rear end edge 70UB of the upper surface 70U.

As shown in FIG. 4, the support surface 73 is inclined along a lower surface 30D of the display panel 30. The holder 70 supports the display panel 30 from below by the support surface 73.

As shown in FIGS. 4 and 7, the holder 70 includes a contact portion 79 located below the support surface 73. The contact portion 79 extends downward in a tapered cylindrical shape from substantially the center of the support surface 73, and protrudes downward in a cylindrical shape from substantially the center of the lower surface 70D. A lower end 79D of the contact portion 79 is closed.

As shown in FIG. 4, the image forming apparatus 1 further includes a frame 90 in the housing 9. Although not shown, the frame 90 is located between the side cover 6L and the image forming unit 5 in the width direction and extends in the front-rear direction and an up-down direction. The frame 90 supports the image forming unit 5.

The frame 90 includes a convex portion 97 on an upper surface thereof. The convex portion 97 protrudes upward directly below the contact portion 79. The lower end 79D of the contact portion 79 is slightly separated upward from an upper end of the convex portion 97, and is configured to come into contact with the convex portion 97.

The lower end 79D of the contact portion 79 is displaced downward by a downward force acting on the support surface 73 in a case where the touch panel 10 is pressed down in a first region A1 of the touch surface 11, which will be described later, and comes into contact with the convex portion 97 of the frame 90 from above.

The holder 70 includes a holding portion 75 on the lower surface 70D. The holding portion 75 includes front end locking pieces 75A and 75B and a positioning shaft 75C which are located in front of the contact portion 79, and a positioning shaft 75D and fitting claws 75E and 75F which are located behind the contact portion 79.

<Control Board>

As shown in FIGS. 7 and 8, the control board 50 is an electric circuit board that controls the display operation panel 3. The control board 50 acquires, from the control unit, which is not shown, various kinds of information such as the setting information and the operation status of the image forming unit 5, controls a display operation of the display panel 30, and cause the display surface 31 to display the information. In addition, the control board 50 controls the touch panel 10, acquires the information on the operation input by the user, and transmits the information to the control unit, which is not shown.

The control board 50 has a flat plate shape including a plurality of recesses and notches. The control board 50 has a circular opening 50H substantially at the center thereof. In addition, the control board 50 includes a positioning recessed portion 50C at a front end thereof and a positioning hole 50D at a rear end thereof.

As shown in FIG. 7, the holding portion 75 holds the control board 50 in the following manner. That is, an assembly worker brings about a state where the control board 50 is located below the lower surface 70D of the holder 70 and a state where the contact portion 79 passes through the opening 50H.

Next, the assembly worker brings about a state where the front end of the control board 50 is higher than the rear end thereof, the front end locking pieces 75A and 75B lock the front end of the control board 50, and the positioning shaft 75C is fitted into the positioning recessed portion 50C.

Further, the assembly worker bring about a state where the rear end of the control board 50 is lifted to the same height as the front end thereof, the fitting claws 75E and 75F, which are snap-fits, are fitted to the rear end of the control board 50, and the positioning shaft 75D is fitted into the positioning hole 50D.

As a result, as shown in FIG. 4, the control board 50 comes into contact with the lower surface 70D from below at a position below the display panel 30, and extends in the horizontal direction. In this state, the contact portion 79 protrudes downward to a position below the control board 50.

<First Cable of Display Operation Panel and Connector of Control Board>

As shown in FIGS. 6 and 8, the display operation panel 3 includes a cable 35. In the present embodiment, the cable 35 is a flexible printed circuit (FPC) in which wiring is printed on a board made of a flexible film or the like.

The cable 35 includes one end 35A and the other end 35B. The one end 35A of the cable 35 is connected to the center of the display panel 30 in the width direction on a front end edge 30A side. The cable 35 protrudes forward and downward from the one end 35A, and further extends rearward to the other end 35B.

The control board 50 includes a connector 53. The connector 53 is located on a lower surface of a portion of the control board 50, the portion being recessed rearward from the center of the front end in the width direction.

As shown in FIG. 4, the connector 53 is located behind and below the front end edge 30A of the display panel 30 in the front-rear direction. The other end 35B of the cable 35 is located below and behind the one end 35A. The other end 35B of the cable 35 is fitted into the connector 53, thereby being connected to the control board 50.

As shown in FIGS. 4 and 7, the control board 50 includes a connector 54 on a rear end edge side thereof. The connector 54 is fitted with one end of a cable, which is not shown, that connects the control board 50 and the control unit, which is not shown.

<Touch Panel>

As shown in FIG. 8, the touch panel 10 has a substantially rectangular flat plate shape and includes the substantially rectangular touch surface 11 on an upper surface 10U. The touch panel 10 is a user interface that determines which position on the touch surface 11 a finger or the like of the user touched by, for example, an electrostatic capacitance method or a resistive film method.

A length of the touch surface 11 in the width direction is slightly larger than a length of the display surface 31 in the width direction. On the other hand, a length of the touch surface 11 in the front-rear direction is significantly larger than a length of the display surface 31 in the front-rear direction.

A side end edge of the touch panel 10 located on the one side in the width direction is referred to as a first side end edge 10L. A side end edge of the touch panel 10 located on the other side in the width direction is referred to as a second side end edge 10R.

As shown in FIG. 4, the touch panel 10 is inclined such that the front end edge 10A is located below the rear end edge 10B. The touch panel 10 overlaps the display panel 30 from above. In this state, the display surface 31 and the touch surface 11 are parallel to each other.

The front end edge 70UA of the upper surface 70U of the holder 70 supports the front end edge 10A of the touch panel 10 with the front end edges of the film 19 and the metal plate member 20 interposed therebetween.

The rear end edge 70UB of the upper surface 70U of the holder 70 supports the rear end edge 10B of the touch panel 10 with the rear end edges of the film 19 and the metal plate member 20 interposed therebetween.

The touch panel 10 is thinner than the display panel 30. In the present embodiment, a thickness of the touch panel 10 is less than half of a thickness of the display panel 30.

As shown in FIGS. 3 and 4, the panel housing unit 103 covers the front end edge 10A, the rear end edge 10B, the first side end edge 10L, and the second side end edge 10R of the touch panel 10, and expose the touch surface 11 through the panel opening 103H.

More specifically, the third portion 130 covers the front end edge 10A of the touch panel 10 with the fourth upper surface 134 that is inclined downward toward the touch surface 11.

The fifth portion 150 covers the rear end edge 10B of the touch panel 10 with the fifth upper surface 155.

The two first portions 110L and 110R cover the first side end edge 10L and the second side end edge 10R of the touch panel 10 with the respective first upper surfaces 111.

The two second portions 120L and 120R cover the first side end edge 10L and the second side end edge 10R of the touch panel 10 with the respective second upper surfaces 122 and the respective first side surfaces 121.

As shown in FIG. 4, the fifth upper surface 155 and the first upper surface 111 are inclined along the touch panel 10.

<First Region and Second Region of Touch Surface>

As shown in FIGS. 2 and 4, the touch surface 11 includes the first region A1 and a second region A2.

As shown in FIG. 4, the first region A1 is a region overlapping the display surface 31 and configured to receive an input operation with respect to the touch panel 10, in which the display panel 30 displays in the first region A1.

A front end A1A of the first region A1 coincides with a front end of the display surface 31. A rear end A1B of the first region A1 coincides with a rear end of the display surface 31.

The second region A2 is a region not overlapping the display surface 31 and configured to receive the input operation with respect to the touch panel 10, in which the display panel 30 does not display in the second region A2. A rear end of the second region A2 is in contact with the front end A1A of the first region A1.

As shown in FIG. 2, the user can visually recognize each mark 19M printed on the film 19 in the second region A2, and performs an operation input of bringing a finger or the like into contact with one of the marks 19M. The plurality of marks 19M are located under the second region A2 of the touch panel 10.

As shown in FIG. 4, the front end edge 30A of the display panel 30 is located behind and above the front end edge 10A of the touch panel 10 such that the second region A2 is located in front of and below the first region A1. The second region A2 is located below the upper surface 9U of the housing 9.

As shown in FIG. 2, a connection point between the first upper surface 111 of the first portion 110L and the second upper surface 122 of the second portion 120L is defined as J1L. A connection point between the first upper surface 111 of the first portion 110R and the second upper surface 122 of the second portion 120R is defined as J1R.

As shown in FIG. 4, a virtual plane VP1, which extends in the width direction of the housing 9, passes through two connection points J1L and J1R between the respective first upper surfaces 111 and the respective second upper surfaces 122, and is orthogonal to the touch surface 11, is set.

The front end A1A of the first region A1 of the touch surface 11 is located closer to a rear end edge 10B side of the touch panel 10 than the virtual plane VP1. In other words, in a case where the two connection points J1L and J1R are virtually projected onto the touch surface 11 in a direction orthogonal to the touch surface 11, the front end A1A of the first region A1 of the touch surface 11 is located closer to the rear end edge 10B side than the two projected connection points J1L and J1R, that is, located above and behind the two projected connection points J1L and J1R.

<First to Fourth Sealing Members>

As shown in FIGS. 5 and 8, each of the first to fourth sealing members 81 to 84 is made of an easily elastically deformable material such as a soft rubber, an elastomer, or a foam material having closed cells. The first sealing member 81 and the second sealing member 82 linearly extend in the front-rear direction. The third sealing member 83 and the fourth sealing member 84 linearly extend in the width direction.

As shown in FIG. 3, the first sealing member 81 is located on the one side in the width direction with respect to the panel opening 103H. The first sealing member 81 seals a gap between the first side end edge 10L of the touch panel 10 and the panel housing unit 103.

The second sealing member 82 is located on the other side in the width direction with respect to the panel opening 103H. The second sealing member 82 seals a gap between the second side end edge 10R of the touch panel 10 and the panel housing unit 103.

As shown in FIGS. 3 and 4, the third sealing member 83 is located in front of the panel opening 103H. The third sealing member 83 seals a gap between the front end edge 10A of the touch panel 10 and the panel housing unit 103.

The fourth sealing member 84 is located behind the panel opening 103H. The fourth sealing member 84 seals a gap between the rear end edge 10B of the touch panel 10 and the panel housing unit 103.

A positional relation of the first to fourth sealing members 81 to 84 with respect to the holder 70 is indicated by a two-dot chain line in FIG. 9. The first sealing member 81 and the third sealing member 83 have a joint S1. The second sealing member 82 and the third sealing member 83 have a joint S2.

<Groove and Communication Hole of Holder>

As shown in FIG. 9, the holder 70 includes grooves 71 and 72 and communication holes 71H and 72H.

One end of the groove 71 is recessed downward in front of an end portion of the front end edge 70UA of the upper surface 70U on the one side in the width direction. In addition, the one end of the groove 71 is located in front of the joint S1 between the first sealing member 81 and the third sealing member 83.

The groove 71 extends a short distance forward from the one end, then bends, extends toward the other side in the width direction, and reaches the other end. The other end of the groove 71 is connected to the communication hole 71H. A liquid spilling on the touch surface 11 and entering the housing 9 from the joint S1 moves on the groove 71 along a dashed arrow Y1, passes through the communication hole 71H, and drips down.

One end of the groove 72 is recessed downward in front of an end portion of the front end edge 70UA of the upper surface 70U on the other side in the width direction. In addition, the one end of the groove 72 is located in front of the joint S2 between the second sealing member 82 and the third sealing member 83.

The groove 72 extends a short distance from the one end toward one side in the width direction, then bends, extends forward, and reaches the other end. The other end of the groove 72 is connected to the communication hole 72H. Liquid spilling on the touch surface 11 and entering the housing 9 from the joint S2 moves on the groove 72 along a dashed arrow Y2, passes through the communication hole 72H, and drips down.

As shown in FIG. 4, the frame 90 includes a groove 96 that is recessed downward directly below the groove 71 of the holder 70. The groove 96 extends in the width direction and is located directly below the communication holes 71H and 72H. The groove 96 stores the liquid dripping from the communication holes 71H and 72H and guides the liquid toward the side cover 6L.

In this way, the grooves 71 and 72 of the holder 70 cooperate with the groove 96 of the frame 90 to guide the liquid entering from the joints S1 and S2 to be away from the image forming unit 3.

<Operation and Effect>

In the image forming apparatus 1 according to the embodiment, as shown in FIG. 4, the display panel 30 thicker than the touch panel 10 is biased to an upper portion of the display operation panel 3, and only the touch panel 10 exists in a lower portion of the display operation panel 3. As a result, in the image forming apparatus 1, it is possible to reduce a thickness of the lower portion of the display operation panel 3 as compared with a configuration in which the display panel 30 and the touch panel 10 overlap each other even in the lower portion of the display operation panel 3.

Therefore, in the image forming apparatus 1 according to the embodiment, it is possible to reduce an increase in size of the display operation panel 3 in the up-down direction. As a result, in the image forming apparatus 1, it is possible to prevent an increase in size of the entire apparatus in the up-down direction.

In addition, in the image forming apparatus 1, as shown in FIG. 2, the panel housing unit 103 includes the first portions 110L and 110R and the second portions 120L and 120R. The connection point between the first upper surface 111 of the first portion 110L and the second upper surface 122 of the second portion 120L is defined as J1L. The connection point between the first upper surface 111 of the first portion 110R and the second upper surface 122 of the second portion 120R is defined as J1R. As shown in FIG. 4, the virtual plane VP1 is set that extends in the width direction of the housing 9, passes through the two connection points J1L and J1R between the respective first upper surfaces 111 and the respective second upper surfaces 122, and is orthogonal to the touch surface 11. The front end A1A of the first region A1 of the touch surface 11 is located closer to the rear end edge 10B side of the touch panel 10 than the virtual plane VP1. With this configuration, the user can easily recognize the front end A1A of the first region A1 for display and operation input with reference to the two connection points J1L and J1R.

Further, in the image forming apparatus 1, the panel housing unit 103 further includes the third portion 130 including the third upper surface 133 and the fourth upper surface 134. With this configuration, the second portions 120L and 120R and the third portion 130 can suitably expose the second region A2 of the touch surface 11 below the second upper surface 122 and the third upper surface 133.

In addition, in the image forming apparatus 1, the display operation panel 3 includes the cable 35 and the control board 50 located below the display panel 30. The cable 35 includes the one end 35A connected to the front end edge 30A side of the display panel 30 and the other end 35B located below and behind the one end 35A and connected to the control board 50, protrudes forward and downward from the one end 35A, and further extends rearward to the other end 35B. With this configuration, an empty space below the touch panel 10 existing in the lower portion of the display operation panel 3 can be effectively used as a space for the cable 35 to make a U-turn.

Further, in the image forming apparatus 1, the control board 50 includes the connector 53 into which the other end 35B of the cable 35 is fitted, and extends in the horizontal direction. The connector 53 is located behind and below the front end edge 30A of the display panel 30 in the front-rear direction. With this configuration, since the U-turn of the cable 35 becomes gentle as compared with a case where the control board 50 is inclined along the display panel 30, an operation of fitting the other end 35B of the cable 35 into the connector 53 of the control board 50 can be easily implemented. In addition, since the rear end edge 30B of the display panel 30 and the rear end edge of the control board 50 are largely separated from each other in the up-down direction, an operation of fitting one end of the cable that is not shown into the connector 54 located on a rear end edge side of the control board 50 can be easily implemented without being affected by the rear end edge 30B of the display panel 30.

In addition, in the image forming apparatus 1, the lower end 79D of the contact portion 79 of the holder 70 is displaced downward by a downward force acting on the support surface 73 in a case where the touch panel 10 is pressed down in the first region A1 of the touch surface 11, and comes into contact with the convex portion 97 of the frame 90 from above. With this configuration, the frame 90 can effectively support the force of pressing the touch panel 10 via the support surface 73 and the contact portion 79. As a result, the image forming apparatus 1 can prevent the touch panel 10 from being damaged.

Further, in the image forming apparatus 1, as shown in FIG. 7, the holder 70 includes, on the lower surface 70D, the holding portion 75 that holds the control board 50. As shown in FIG. 4, the contact portion 79 protrudes downward to a position below the control board 50, and the lower end 79D is contactable with the frame 90 from above. The control board 50 includes the opening 50H through which the contact portion 79 passes. With such an opening 50H, the layout flexibility of the contact portion 79 and the control board 50 can be improved.

In addition, in the image forming apparatus 1, as shown in FIG. 9, the holder 70 includes the groove 71 that guides the liquid entering from the joint S1 between the first sealing member 81 and the third sealing member 83. In addition, the holder 70 includes the groove 72 that guides the liquid entering from the joint S2 between the second sealing member 82 and the third sealing member 83. Further, the holder 70 includes the communication hole 71H connected to the other end of the groove 71 and the communication hole 72H connected to the other end of the groove 72. The frame 90 includes the groove 96 that stores the liquid dripping from the communication holes 71H and 72H and guides the liquid toward the side cover 6L. With this configuration, it is possible to prevent the occurrence of a defect in the image forming unit 5 due to the liquid entering from the joint S1 between the first sealing member 81 and the third sealing member 83, and the joint S2 between the second sealing member 82 and the third sealing member 83.

Although the present disclosure has been described with reference to the embodiment, it is needless to say that the present disclosure is not limited to the above embodiment and can be appropriately modified and applied without departing from the gist thereof.

In the embodiment, the display panel 30 is a liquid crystal display, but the present disclosure is not limited to this configuration. For example, the display panel may be an organic EL display.

In the embodiment, the contact portion 79 has a cylindrical shape in which the lower end 79D is closed, but the present disclosure is not limited to this configuration. For example, the contact portion may be a rib, a columnar protrusion, or the like.

In the embodiment, the rear end of the second region A2 is in contact with the front end A1A of the first region A1, but the present disclosure is not limited to this configuration. For example, the rear end of the second region may be separated from the front end of the first region A1.

In the embodiment, the opening 50H of the control board 50 is a hole, but the present disclosure is not limited to this configuration. For example, the opening of the control board 50 may be a notch or the like.

In the embodiment, the cable 35 is a flexible printed circuit, but the present disclosure is not limited to this configuration. For example, the cable may be a flexible flat cable.

In the embodiment, the two connection points J1L and J1R, between the respective first upper surfaces 111 and the respective second upper surfaces 122, extend in the width direction of the housing 9 and are formed in an angled and recessed shape, but the present disclosure is not limited to this configuration. For example, the two connection points J1L and J1R may be connected to be continuous in an R shape. In this case, as the connection points J1L and J1R, for example, virtual portions intersecting in a case where the first upper surfaces 111 and the second upper surfaces 122 are virtually continuous may be regarded as the connection points J1L and J1R, and a position of the front end A1A of the first region A1 of the touch surface 11 may be set with reference to the regarded connection points J1L and J1R. A connection point between the first upper surface 111 and the R shape or a connection point between the second upper surface 122 and the R shape may be regarded as the connection points J1L and J1R.

The present disclosure is applicable to, for example, an image forming apparatus or a multifunction machine having a printer function and a scanner function.

What is claimed is:

1. An image forming apparatus comprising:
   an image forming unit including a photosensitive drum;
   a housing configured to house the image forming unit; and
   a display operation panel located on an upper surface of the housing,
   wherein the display operation panel includes:
      a display panel having a plate shape, including a display surface on an upper surface of the display panel, and being inclined such that a front end edge of the display panel is located below a rear end edge of the display panel; and
      a touch panel having a plate shape thinner than the display panel, including a touch surface on an upper surface of the touch panel, being inclined such that a front end edge of the touch panel is located below a rear end edge of the touch panel, and overlapping the display panel from above,
   the touch surface includes:
      a first region overlapping the display surface and configured to receive an input operation with respect to the touch panel; and
      a second region not overlapping the display surface and configured to receive the input operation with respect to the touch panel, and
   the front end edge of the display panel is located behind and above the front end edge of the touch panel such that the second region is located in front of and below the first region.

2. The image forming apparatus according to claim 1,
   wherein the housing includes a cover having an opening, configured to cover the front end edge, the rear end edge, a first side end edge, and a second side end edge of the touch panel, and configured to expose the touch surface through the opening,
   the cover includes:
      two first portions including respective first upper surfaces that are inclined along the touch panel, the respective two first portions covering the first side end edge and the second side end edge; and
      two second portions including respective second upper surfaces that are connected with the respective first upper surfaces to extend in a horizontal direction, the respective two second portions being located in front of the respective first portions and covering the first side end edge and the second side end edge, and
   a front end of the first region of the touch surface is located on a side of the rear end edge of the touch panel than a virtual plane that extends in a width direction of the housing, passes through two connection points between the first upper surfaces and the second upper surfaces, and is orthogonal to the touch surface.

3. The image forming apparatus according to claim 2,
   wherein the cover includes a third portion covering the front end edge of the touch panel, the third portion including a third upper surface that is connected with each of the second upper surfaces to extend in the horizontal direction, and a fourth upper surface that is inclined downward from the third upper surface toward the touch surface.

4. The image forming apparatus according to claim 1,
   wherein the display operation panel includes:
      a control board located below the display panel and configured to control the display operation panel; and
      a cable including one end connected to a front end edge side of the display panel, and an other end located below and behind the one end and connected to the control board, the cable protruding forward and downward from the one end and further extending rearward to the other end.

5. The image forming apparatus according to claim 4,
   wherein the control board includes a connector into which the other end of the cable is fitted, and extends in the horizontal direction, and
   the connector is located behind the front end edge of the display panel in a front-rear direction.

6. The image forming apparatus according to claim 1, further comprising:
   a frame configured to support the image forming unit in the housing,
   wherein the display operation panel includes a holder including a support surface, on an upper surface of the holder, along a lower surface of the display panel and configured to support the display panel from below by the support surface, and
   the holder includes a contact portion located below the support surface and configured to come into contact with the frame from above in a case where the touch panel is pressed in the first region.

7. The image forming apparatus according to claim 6,
   wherein the contact portion is a protrusion protruding downward from the support surface, and
   a lower end of the protrusion is configured to come into contact with the frame from above in a case where the touch panel is pressed in the first region.

8. The image forming apparatus according to claim 6,
   wherein the display operation panel includes a control board located below the display panel and configured to come into contact with the lower surface of the holder from below, the display operation panel being configured to control the display operation panel,
   the contact portion protrudes downward to a position below the control board,
   a lower end of the contact portion is configured to come into contact with the frame from above, and
   the control board has an opening through which the contact portion passes.

9. The image forming apparatus according to claim 6,
   wherein the housing includes:
      a cover having an opening, configured to cover the front end edge, the rear end edge, a first side end edge, and a second side end edge of the touch panel, and configured to expose the touch surface through the opening;
a first sealing member configured to seal a gap between the cover and the first side end edge of the touch panel;
a second sealing member configured to seal a gap between the cover and the second side end edge of the touch panel; and
a third sealing member configured to seal a gap between the cover and the front end edge of the touch panel, and the holder includes a groove configured to guide liquid entering from a joint between the first sealing member and the third sealing member, and a joint between the second sealing member and the third sealing member.

10. The image forming apparatus according to claim 6, wherein the holder includes a holding portion on a lower surface of the holder, the holding portion being configured to hold the control board, and
the holding portion includes a locking piece configured to lock a front end of the control board, and a fitting claw configured to fit to a rear end of the control board.

11. The image forming apparatus according to claim 6, wherein the display operation panel includes a metal plate of which an upper surface is substantially flush with the display surface, the metal plate being configured to come into contact with the front end edge, the rear end edge, and a pair of side end edges of the display panel to sandwich the display panel.

12. The image forming apparatus according to claim 11, wherein the display operation panel includes a film having a hole larger than an outer shape of the display panel, the film overlapping the metal plate from above and being configured to expose the display surface through the hole.

13. The image forming apparatus according to claim 12, wherein a plurality of marks are printed, on the film, below the hole, and
the plurality of marks are located under the second region of the touch panel.

14. An image forming apparatus comprising:
an image forming unit including a photosensitive drum;
a housing configured to house the image forming unit; and
a display operation panel located on an upper surface of the housing,
wherein the display operation panel includes:
a display panel having a plate shape and including a display surface on an upper surface of the display panel; and
a touch panel having a plate shape, including a touch surface on an upper surface of the touch panel, and overlapping the display panel from above,
the touch surface includes:
a first region overlapping the display surface and configured to receive an input operation with respect to the touch panel; and
a second region located below the first region, not overlapping the display surface, and configured to receive the input operation with respect to the touch panel, the second region of the touch surface is located below the upper surface of the housing, and
wherein the display panel is inclined such that a front end edge of the display panel is located below a rear end edge of the display panel,
the touch panel is inclined such that a front end edge of the touch panel is located below a rear end edge of the touch panel, and overlaps the display panel from above, and
the front end edge of the display panel is located behind and above the front end edge of the touch panel.

* * * * *